D. FASIG.
Improvement in Tongue for Reapers and Mowers.

No. 132,270.  Patented Oct. 15, 1872.

Witnesses:
Aug. H. Girard.
J. West Wagner

Inventor:
Daniel Fasig.
By Johnson, Klaucke &Co
his Attorneys

UNITED STATES PATENT OFFICE.

DANIEL FASIG, OF ROWSBURG, OHIO, ASSIGNOR OF TWO-THIRDS HIS RIGHT TO GEO. B. COLE AND I. S. COLE, OF SAME PLACE.

IMPROVEMENT IN TONGUES FOR REAPERS AND MOWERS.

Specification forming part of Letters Patent No. 132,270, dated October 15, 1872.

*To all whom it may concern:*

Be it known that I, DANIEL FASIG, of Rowsburg, in the county of Ashland and State of Ohio, have invented a new and useful Improvement in Devices for Preventing Side Draft in Reaping and Mowing Machines, of which the following is a specification:

My invention relates to devices for equalizing the side draft of side-draft reaping and mowing machines; and the invention which forms the subject-matter of this application consists in constructing the tongue of a fixed and a pivoted section—the latter constituting the draft or whiffletree pole—and, in connection therewith, a fixed open socket-strap, within which its rear end has a limited free movement upon the fixed tongue, and kept in proper draft line therewith by a laterally-acting spring, by which construction the point of draft is transferred from the whiffletree to the point of pivot of the sections, enabling the horses to be kept clear of the standing grain, and at the same time preserving the proper position of the cutting apparatus, while the outer end of the socket-strap acts as a purchase, against which the inner end of the draft-pole bears in turning corners, as will be hereinafter more particularly described.

Figure 1:
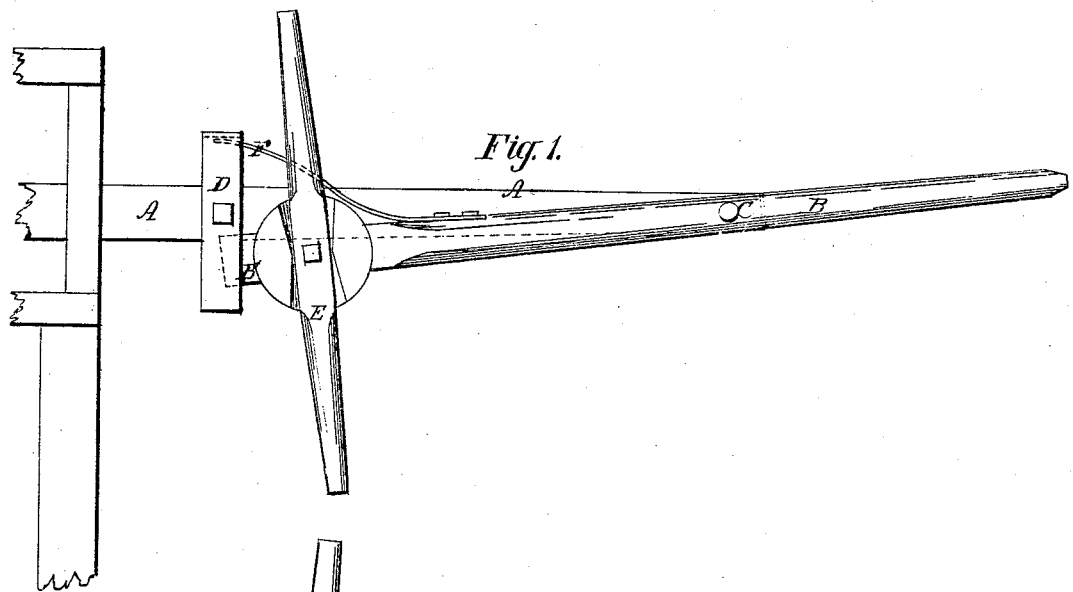
Figure 2:
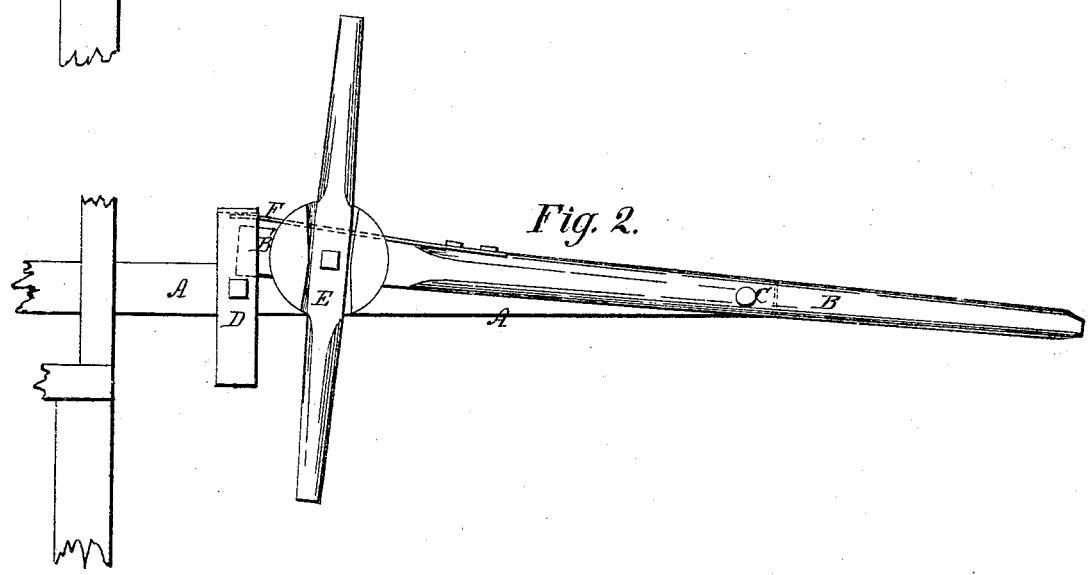
Figure 3:

In the accompanying drawing, Figure 1 represents a top view of a pole or tongue, the draft section whereof is shown in the position it occupies to equalize the draft of a side-draft reaping or mowing machine; Fig. 2 represents a similar view, the draft-pole of the tongue being shown in the position it occupies when turning the machine; and Fig. 3 represents a side view thereof.

The tongue A is secured to the gearing side of the frame, from which the cutting apparatus projects to one side and exerts a more-or-less constant side draft upon the carrying-wheels, to prevent which the fixed tongue A is provided with a draft-pole, B, pivoted at C to the end of the tongue, and extending beyond it a suitable distance. The fixed tongue A is provided near its connection with the frame of the machine with an oblong open cross-strap, D, projecting about two inches from either side of the tongue A to receive and confine the inner end B' of the draft-pole B and allow it to have a shifting movement therein upon its pivot. The fixed and draft sections A and B of the tongue thus arranged are lapped with each other; and the draft-pole B is supported upon the fixed tongue and carries the whiffletree E, which has a swiveling movement thereon. A spring, F, is secured to the side of the draft-pole B, which extends into and bears against the inner end of the open guide-strap D, the object of which is to constantly bear the inner free end of the draft-pole B outward and out of line with the fixed tongue A, as shown in Fig. 1 of the drawing. The horses pull, in an oblique direction, away from the standing grain, and, by reason of the pivot heretofore described, the side draft is necessarily equalized, because the direct draft is not at the whiffletree, but at the point C, where the swinging tongue is pivoted to the main tongue. This counteracts the side-dragging effect of the cutting apparatus; and the off-horse is relieved from the strain upon his shoulder and kept away from the standing grain, while, at the same time, the machine moves forward in a straight line. This effect is produced by an oblique pivoted pole pulling from a straight fixed tongue, the whiffletree being always at right angles to the pivoted section of the tongue.

The action of the spring F is to keep the rear end of the pivoted pole about four or five inches out of a right line with the tongue toward the cutting apparatus. The socket-strap D also acts as a purchase and lock to the inner end of the draft-pole B in turning corners, and avoids the necessity of stopping the machine in doing so.

Having described my invention, I claim—

1. The combination of the fixed and pivoted draft sections A B of the tongue with the fixed open holding-strap D, constructed and arranged to prevent side draft, as described.

2. In combination with the fixed and pivoted draft sections of the tongue and the holding socket-strap, I claim the laterally-acting spring F, for the purpose described.

In testimony whereof I have hereunto set my hand in the presence of two witnesses this 7th day of September, A. D. 1872.

DANIEL FASIG.

Witnesses:
A. E. H. JOHNSON,
J. W. HAMILTON JOHNSON.